US011763991B2

(12) United States Patent
Lee et al.

(10) Patent No.: US 11,763,991 B2
(45) Date of Patent: *Sep. 19, 2023

(54) MULTI-LAYERED CERAMIC CAPACITOR AND METHOD OF MANUFACTURING THE SAME

(71) Applicant: SAMSUNG ELECTRO-MECHANICS CO., LTD., Suwon-si (KR)

(72) Inventors: Ji Won Lee, Suwon-si (KR); Jun Ho Yun, Suwon-si (KR); Seung Ryeol Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/093,885

(22) Filed: Jan. 6, 2023

(65) Prior Publication Data

US 2023/0145322 A1     May 11, 2023

Related U.S. Application Data

(60) Continuation of application No. 17/835,053, filed on Jun. 8, 2022, now Pat. No. 11,581,145, which is a
(Continued)

(30) Foreign Application Priority Data

Aug. 23, 2019    (KR) .................. 10-2019-0103621

(51) Int. Cl.
     *H01G 4/30*      (2006.01)
     *H01G 4/14*      (2006.01)
     *H01G 4/12*      (2006.01)

(52) U.S. Cl.
     CPC ............ *H01G 4/14* (2013.01); *H01G 4/1227* (2013.01); *H01G 4/30* (2013.01)

(58) Field of Classification Search
None
See application file for complete search history.

(56) References Cited

U.S. PATENT DOCUMENTS 2,619,443 A    11/1952   Preston
4,552,786 A    11/1985   Berneburg et al.
(Continued)

FOREIGN PATENT DOCUMENTS

JP           H08-028310 B2     3/1996
KR    10-2006-0086576 A     8/2006
(Continued)

OTHER PUBLICATIONS

Korean Office Action dated Oct. 27, 2020 issued in Korean Patent Application No. 10-2019-0103621 (with English translation).

*Primary Examiner* — Dion R. Ferguson
(74) *Attorney, Agent, or Firm* — Morgan, Lewis & Bockius LLP

(57) ABSTRACT

A multilayer ceramic capacitor includes a ceramic body including a dielectric layer and first and second internal electrodes disposed to oppose each other with the dielectric layer interposed therebetween, and first and second external electrodes disposed outside of the ceramic body and connected to the first and second internal electrodes, respectively. The ceramic body includes an active portion including of the first and second internal electrodes disposed to oppose each other with the dielectric layer interposed therebetween to form capacitance, and a cover portion disposed in upper and lower portions of the active portion. The cover portion has a larger number of pores than the dielectric layer of the active portion, and the cover portion includes a
(Continued)

ceramic-polymer composite filled with a polymer in the pores of the cover portion.

8 Claims, 4 Drawing Sheets

Related U.S. Application Data division of application No. 16/816,666, filed on Mar. 12, 2020, now Pat. No. 11,387,044.

(56) References Cited

U.S. PATENT DOCUMENTS

| | | | |
|---|---|---|---|
| 5,043,843 A | 8/1991 | Kimura et al. | |
| 5,277,725 A | 1/1994 | Acocella et al. | |
| 11,387,044 B2 * | 7/2022 | Lee | H01G 4/1227 |
| 11,581,145 B2 * | 2/2023 | Lee | H01G 4/1227 |
| 2010/0077582 A1 | 4/2010 | Kim et al. | |
| 2013/0076203 A1 | 3/2013 | Saito et al. | |
| 2016/0196918 A1 | 1/2016 | Hong et al. | |
| 2018/0012702 A1 | 1/2018 | Azuma et al. | |

FOREIGN PATENT DOCUMENTS

| | | |
|---|---|---|
| KR | 10-2010-0035461 A | 4/2010 |
| KR | 10-2014-0128099 A | 11/2014 |
| KR | 10-2015-0134898 A | 12/2015 |
| KR | 10-2016-0084614 A | 7/2016 |
| WO | 2011/145455 A1 | 11/2011 |
| WO | 2016/121745 A1 | 8/2016 |

* cited by examiner

II-II'

A

MULTI-LAYERED CERAMIC CAPACITOR AND METHOD OF MANUFACTURING THE SAME

CROSS-REFERENCE TO RELATED APPLICATION(S)

This application is the continuation application of U.S. patent application Ser. No. 17/835,053 filed on Jun. 8, 2022, now U.S. Pat. No. 11,581,145 issued on Feb. 14, 2023, which is the divisional application of U.S. patent application Ser. No. 16/816,666 filed on Mar. 12, 2020, now U.S. Pat. No. 11,387,044 which issued on Jul. 12, 2022, which claims benefit of priority to Korean Patent Application No. 10-2019-0103621 filed on Aug. 23, 2019 in the Korean Intellectual Property Office, the disclosure of which is incorporated herein by reference in its entirety.

BACKGROUND

1. Field

The present disclosure relates to a multilayer ceramic capacitor and a method of manufacturing the same.

2. Description of Related Art

Generally, an electronic component using a ceramic material such as a capacitor, an inductor, a piezoelectric device, a varistor, a thermistor, or the like, may include a ceramic body formed of a ceramic material, an internal electrode formed inside the ceramic body, and an external electrode disposed on a surface of the ceramic body to be connected to the internal electrode.

A multilayer ceramic capacitor, an electronic component, is an electronic component having chip form, used for charging or discharging electricity in various electronic circuit systems in the field of electric electronic components including information technology (IT), entertainment systems, powertrain systems, electronic control units (ECU), and the like.

Since electric multilayer ceramic capacitors are used in harsh environments, high reliability and durability are required therein.

In particular, reliability characteristics according to temperature and humidity in a high-temperature and high-humidity environment must be excellent, and mechanical characteristics able to withstand bending deformation of a mounting substrate due to vibrations and other requirements of a vehicle body must be excellent.

Conventionally, in order to enhance bending strength, an improvement of hardness of a body of the multilayer ceramic capacitor or a development of a technology for the external electrode has mainly been made. As such, a need exists for development of cover portions and/or margin portions that provide enhanced bending strength.

SUMMARY

An aspect of the present disclosure is to provide a multilayer ceramic capacitor capable of improving reliability and a method of manufacturing the same.

According to an aspect of the present disclosure, a multilayer ceramic capacitor includes a ceramic body including a dielectric layer and first and second internal electrodes disposed to oppose each other with the dielectric layer interposed therebetween, and having a first surface and a second surface opposing each other, a third surface and a fourth surface opposing each other and connecting the first and second surfaces, and a fifth surface and a sixth surface connected to the first to fourth surfaces and opposing each other, and first and second external electrodes disposed outside of the ceramic body and connected to the first and second internal electrodes, respectively. The ceramic body includes an active portion including the first and second internal electrodes disposed to oppose each other with the dielectric layer interposed therebetween to form capacitance, and a cover portion disposed in upper and lower portions of the active portion. The cover portion has a larger number of pores than the dielectric layer of the active portion, and the cover portion includes a ceramic-polymer composite filled with a polymer in the pores of the cover portion.

According to another aspect of the present disclosure, a method of manufacturing a multilayer ceramic capacitor includes preparing a plurality of first ceramic green sheets on which a plurality of first internal electrodes are disposed and a plurality of first ceramic green sheets on which a plurality of second internal electrodes are disposed, alternately stacking the first ceramic green sheets having the first and second internal electrode patterns so that the first internal electrode patterns and the second internal electrode patterns overlap each other, and stacking second ceramic green sheets having a composition different from the composition of the first ceramic green sheets on upper and lower portions thereof to form a laminated body. A ceramic body is prepared including dielectric layers and first and second internal electrodes by sintering the laminated body. The ceramic body includes an active portion including first and second internal electrodes disposed to oppose each other with the dielectric layers interposed therebetween to form capacitance and a cover portion disposed in upper and lower portions of the active portion. The cover portion has a larger number of pores than the dielectric layer of the active portion. After the preparing of the ceramic body, a paste including a polymer is applied to the cover portion to fill the pores of the cover portion with the polymer is included.

According to further aspect of the present disclosure, a multilayer ceramic capacitor includes a ceramic body including a plurality of first internal electrodes and a plurality of second internal electrodes that are alternately stacked with dielectric layers therebetween. The ceramic body includes upper and lower cover portions respectively disposed above an uppermost internal electrode and below a lowermost internal electrode of the first and second internal electrodes, and the upper and lower cover portions include a higher content of polymer than the dielectric layers disposed between the alternately stacked first and second internal electrodes.

According to another aspect of the present disclosure, a multilayer ceramic capacitor includes a ceramic body including a plurality of first internal electrodes and a plurality of second internal electrodes that are alternately stacked to overlap each other in a thickness direction with dielectric layers therebetween. The first and second internal electrodes are spaced apart by a margin portion from side surfaces of the ceramic body opposite each other in a width direction orthogonal to the thickness direction, and the margin portion includes a higher content of polymer than the dielectric layers disposed between the alternately stacked first and second internal electrodes.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
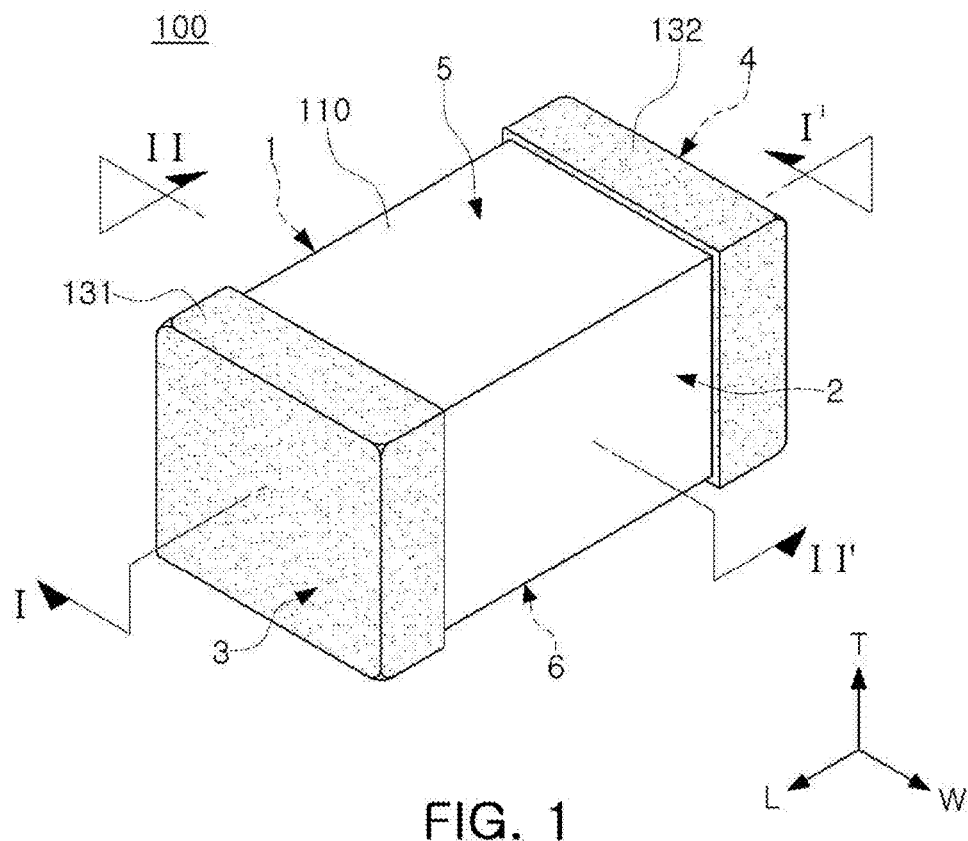
FIG. 1 is a schematic perspective view illustrating a multilayer ceramic capacitor according to an embodiment of the present disclosure.

Hereinafter, embodiments of the present disclosure will be described in detail with reference to the accompanying drawings. The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity. Further, in the drawings, elements having the same functions within the same scope of the inventive concept will be designated by the same reference numerals.

FIG. 1 is a schematic perspective view illustrating a multilayer ceramic capacitor according to an embodiment of the present disclosure.

Figure 2:
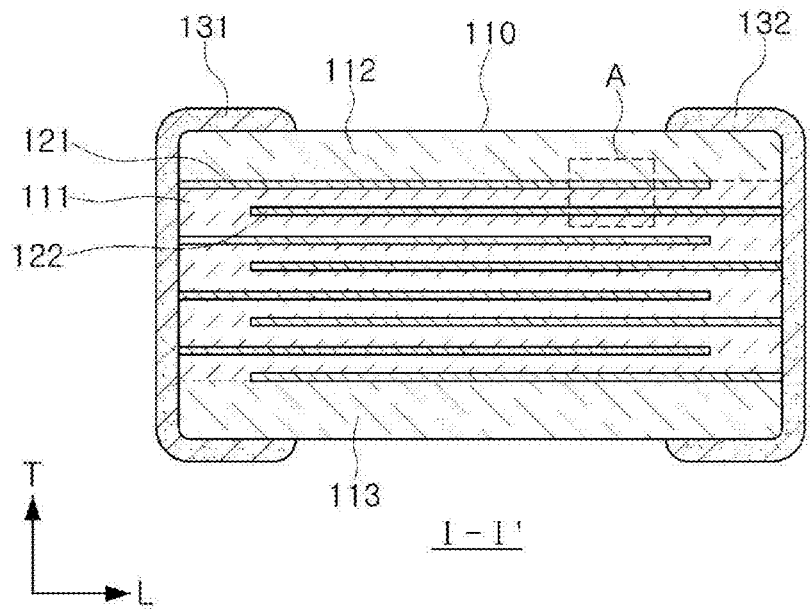
FIG. 2 is a cross-sectional view taken along line I-I' of FIG. 1.

FIG. 2 is a cross-sectional view taken along line I-I' of FIG. 1.

Figure 3:
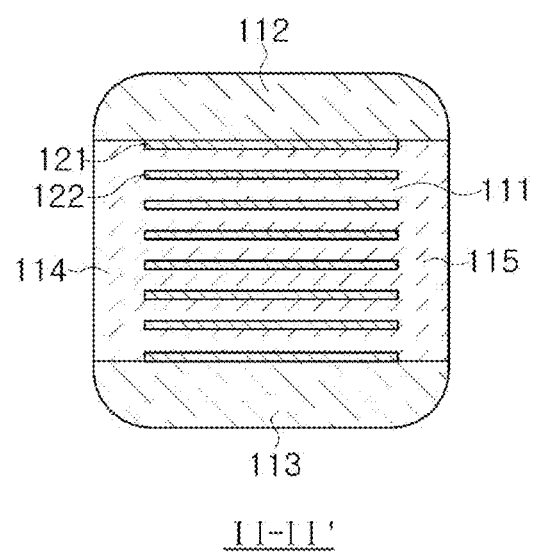
FIG. 3 is a cross-sectional view taken along line II-II' of FIG. 1.

FIG. 3 is a cross-sectional view taken along line II-II' of FIG. 1.

Figure 4:
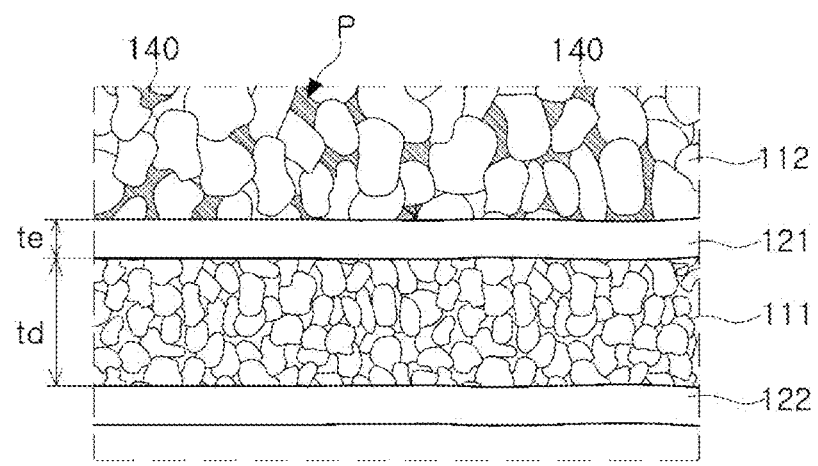
FIG. 4 is an enlarged view of region A of FIG. 2.

FIG. 4 is an enlarged view of region A of FIG. 2.

Referring to FIGS. 1 to 4, a multilayer ceramic capacitor 100 according to an embodiment of the present disclosure may include a ceramic body 110, a plurality of internal electrodes 121 and 122 formed in the ceramic body 110, and external electrodes 131 and 132 formed on an outer surface of the ceramic body 110.

The ceramic body 110 may have a first surface 1 and a second surface 2 opposing each other, a third surface 3 and a fourth surface 4 opposing each other and connected to the first and second surfaces 1 and 2, and a fifth surface 5 and a sixth surface 6, which are upper and lower surfaces opposing each other and connected to the first, second, third, and fourth surfaces.

The first surface 1 and the second surface 2 may be defined as surfaces opposing each other in a width direction of the ceramic body 110, the third surface 3 and the fourth surface 4 may be defined as surfaces opposing each other in a longitudinal or length direction, and the fifth surface 5 and the sixth surface 6 may be defined as surfaces opposing each other in a thickness direction.

The shape of the ceramic body 100 is not particularly limited, but may be a rectangular parallelepiped shape as shown.

One end of each of the plurality of internal electrodes 121 formed in the ceramic body 110 may be exposed to the third surface 3, and one end of each of the plurality of internal electrodes 122 formed in the ceramic body 110 may be exposed to the fourth surface 4 of the ceramic body.

The internal electrodes 121 and 122 may be formed as pairs of the first internal electrode 121 and the second internal electrode 122 having different polarities and separated from each other by a dielectric layer 111.

One end of each first internal electrode 121 may be exposed to the third surface 3, and one end of each second internal electrode 122 may be exposed to the fourth surface 4.

The ends of the first internal electrode 121 and the second internal electrode 122 opposite to the exposed ends may be disposed at a predetermined distance inside the ceramic body 110 from the fourth surface 4 and the third surface 3, respectively.

A first external electrode 131 may be formed on the third surface 3 of the ceramic body to be electrically connected to the first internal electrode(s) 121, and a second external electrode 132 may be formed on the fourth surface 4 of the ceramic body to be electrically connected to the second internal electrode(s) 122.

The first and second external electrodes 131 and 132 may be electrically connected to the first and second internal electrodes 121 and 122, respectively, to form capacitance, and the second external electrode 132 may be connected to a potential different from the first external electrode 131.

The plurality of dielectric layers 111 are in a sintered state, and the dielectric layers 111 may be integrated with each other such that it may be difficult to identify boundaries between adjacent dielectric layers 111 with the naked eye.

A length of the ceramic body 110 corresponds to a distance from the third surface 3 to the fourth surface 4 of the ceramic body.

According to an embodiment of the present disclosure, a raw material for forming the dielectric layer 111 is not particularly limited as long as sufficient capacitance can be obtained therewith. For example, a barium titanate based material, a lead composite perovskite based material, a strontium titanate based material, or the like can be used.

As a material for forming the dielectric layer 111, various ceramic additives, organic solvents, plasticizers, binders, dispersants, and the like, may be added to powder such as barium titanate ($BaTiO_3$) according to the purpose of the present disclosure.

Internal electrodes 121 and 122 may be formed on the dielectric layers 111, and the internal electrodes 121 and 122 may be formed in the ceramic body with one dielectric layer 111 interposed therebetween by sintering.

Referring to FIG. 2, a first internal electrode 121 is formed in the dielectric layer 111. The first internal electrode 121 is not entirely formed in a longitudinal direction of the dielectric layer. That is, one end of the first internal electrode 121 may be formed at a predetermined distance from the fourth surface 4 of the ceramic body, and the other end of the first internal electrode 121 may be formed to extend to the third surface 3 and be exposed to the third surface 3.

An end portion of the first internal electrode 121 exposed to the third surface 3 of the ceramic body is connected to the first external electrode 131.

In contrast to the first internal electrode, one end of the second internal electrode 122 may be formed at a predetermined distance from the third surface 3, and the other end of the second internal electrode 122 may be exposed to the fourth surface 4 and connected to the second external electrode 132.

The internal electrodes may be stacked in more than 400 layers to implement a high-capacity multilayer ceramic capacitor, but is not necessarily limited thereto.

The ceramic body 110 may be composed of an active portion serving as a portion contributing to capacitance formation and including the internal electrodes 121 and 122, and upper and lower cover portions 112 and 113 formed in the upper and lower portions of the active portion as upper and lower margin parts, respectively. The upper and lower cover portions 112 and 113 may be free of any internal electrodes, and may be disposed above an uppermost internal electrode and below a lowermost internal electrode, respectively, in the ceramic body 110.

The active portion may be formed by repeatedly and alternately stacking the first and second internal electrodes 121 and 122 with the dielectric layers 111 interposed therebetween.

The upper and lower cover portions 112 and 113 are similar to the dielectric layer 111 except that they do not include internal electrodes, but according to an embodiment of the present disclosure, a dielectric composition of the cover portion(s) and a dielectric composition of the dielectric layer(s) of the active portion may be different from each other.

That is, the upper and lower cover portions may include a ceramic material, for example, may include a barium titanate ($BaTiO_3$) based ceramic material.

According to an embodiment of the present disclosure, to form a cover portion of a porous structure in which pores of the upper and lower cover portions 112 and 113 after sintering are more numerous than (e.g., are provided at a higher density than) pores of the dielectric layer(s) 111 of the active portion, the dielectric composition of the upper and lower cover portions 112 and 113 may be different in types and contents of additives or binders, with respect to the dielectric composition of the dielectric layer(s) 111 of the active portion.

For example, a method may be used to adjust the content of magnesium (Mg) included in the upper and lower cover portions 112 and 113 to be less than the content of magnesium (Mg) included in the dielectric layer 111 of the active portion.

Alternatively, the binder used to form the dielectric layer 111 of the active portion may use a polyvinyl butyral (PVB) based binder as in the prior art, and the binder used to form the upper and lower cover portions 112 and 113 may use an acryl-based binder.

Referring to FIG. 4, in the multilayer ceramic capacitor according to an embodiment of the present disclosure, the upper and lower cover portions 112 and 113 may have a larger number or higher density of pores P than the dielectric layer 111 of the active portion, and the upper and lower cover portions 112 and 113 may include a ceramic-polymer composite in which a polymer 140 is filled in the pores P of the upper and lower cover portions 112 and 113.

According to an embodiment of the present disclosure, the upper and lower cover portions 112 and 113 may have a porous structure in which the pores of the upper and lower cover portions 112 and 113 after sintering are more numerous than the pores of the dielectric layer 111, and a polymer is filled in the pores of the upper and lower cover portions 112 and 113, such that the upper and lower cover portions 112 and 113 may be formed to have a ceramic-polymer composite structure, thereby improving bending strength and improving moisture resistance reliability, at the same time.

In detail, when the polymer is filled in the pores of the upper and lower cover portions 112 and 113 and the upper and lower cover portions 112 and 113 are formed to have a ceramic-polymer composite structure, since ductility of the upper and lower cover portions 112 and 113 is improved, bending strength may be improved, and at the same time, moisture resistance reliability may be improved.

In addition, by forming the upper and lower cover portions 112 and 113 with a ceramic-polymer composite structure, it is possible to solve a problem of lowering the moisture resistance reliability due to the transfer of charges by reducing electrical conductivity.

According to an embodiment of the present disclosure, a polymer may not be filed in the pores in the dielectric layer 111 of the active portion.

According to an embodiment of the present disclosure, in order to improve bending strength and improve the moisture resistance reliability of the electric multilayer ceramic capacitor, since the upper and lower cover portions 112 and 113 are formed in a porous structure after sintering, and the polymer 140 is filled in the pores P of the upper and lower cover portions 112 and 113, the pores in the dielectric layer 111 of the active portion may not be filled with the polymer.

In the conventional multilayer ceramic capacitor there has been an attempt to include a dielectric layer made of a composite material in which ceramic powder and a polymer are mixed.

However, in order to include the dielectric layer made of a composite material mixed with ceramic powder and a polymer, the ceramic body may not be fired, and when a sintering process is performed, the polymer may be lost in a high-temperature sintering process and may generally not remain in a final product, and thus, an effect due to the polymer may not be obtained.

According to an embodiment of the present disclosure, since a ceramic body is fired differently from the prior art, and a polymer 140 is filled in the pores P of the upper and lower cover portions 112 and 113 after sintering, the polymer 140 may remain in a cover portion of the multilayer ceramic capacitor and may constitute a ceramic-polymer composite.

On the other hand, pores in the dielectric layer 111 of the active portion have a structure in which a polymer is not filled.

As described above, according to an embodiment of the present disclosure, since the polymer is filled in the pores of the cover portion(s) after the sintering process is performed, ductility of the upper and cover portions 112 and 113 may be improved, thereby obtaining an effect of improving bending strength and improving moisture resistance reliability.

Meanwhile, referring to FIG. 4, in the multilayer ceramic capacitor according to an embodiment of the present disclosure, a thickness td of the dielectric layer 111 and a thickness te of the internal electrodes 121 and 122 may satisfy $td > 2 \times te$.

That is, according to an embodiment of the present disclosure, the thickness td of the dielectric layer 111 may be equal to twice or more the thickness te of the internal electrodes 121 and 122.

In general, in high-voltage electric electronic components, a reliability problem caused by a drop in a dielectric breakdown voltage in a high-voltage environment is a major issue.

In the multilayer ceramic capacitor according to an embodiment of the present disclosure, the thickness td of the dielectric layer 111 may be equal to twice or more the thickness te of the internal electrodes 121 and 122 to prevent lowering of the dielectric breakdown voltage in harsh environments, such that the dielectric breakdown voltage characteristic may be improved by increasing the thickness of the dielectric layer, which may correspond to an increase in a distance between the internal electrodes.

When the thickness td of the dielectric layer 111 is twice or less than the thickness te of the internal electrodes 121 and 122, the thickness of the dielectric layer (corresponding to a distance between the internal electrodes) may be thin, thereby lowering the dielectric breakdown voltage.

The thickness te of the internal electrode may be less than 1 μm, and the thickness td of the dielectric layer may be less than 2.8 μm, but is not necessarily limited thereto.

Figure 5:
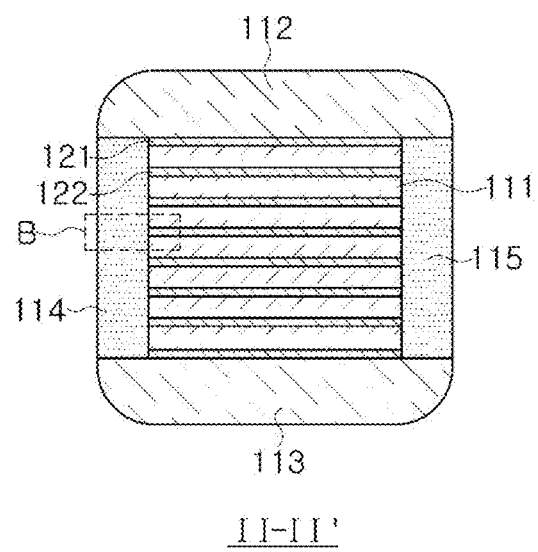
FIG. 5 is a cross-sectional view taken along the line II-II' of FIG. 1 according to another embodiment of the present disclosure.

FIG. 5 is a cross-sectional view taken along the line II-II' of FIG. 1 according to another embodiment of the present disclosure.

Figure 6:
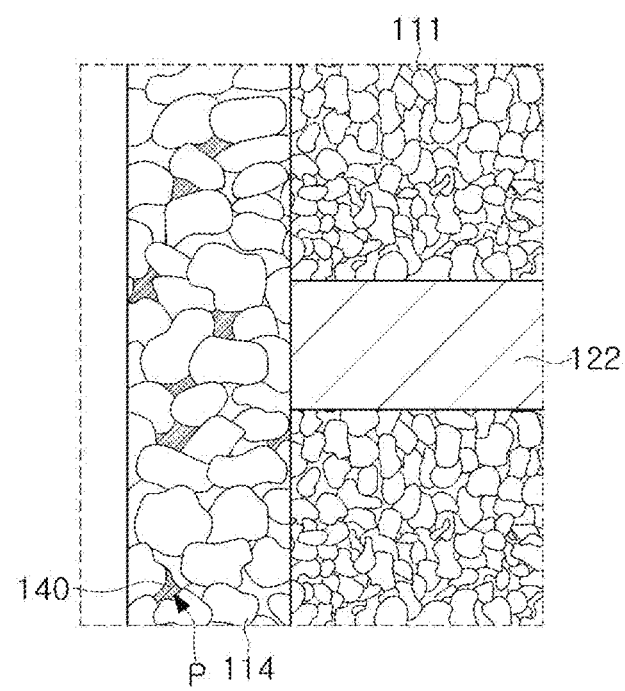
FIG. 6 is an enlarged view of region B of FIG. 5.

FIG. 6 is an enlarged view of region B of FIG. 5.

Referring to FIGS. 5 and 6, in the multilayer ceramic capacitor according to another embodiment of the present disclosure, margin portions 114 and 115 may be disposed on one or both opposing side surface(s) of the active portion.

The margin portions may be comprised of a first margin portion 114 disposed on the first surface 1 of the ceramic body 110 and a second margin portion 115 disposed on the second surface 2.

The margin parts 114 and 115 may have a larger number of pores than the dielectric layer 111 of the active portion 111.

In order to form margin parts 114 and 115 of a porous structure after sintering having the pores of the margin parts 114 and 115 after sintering that are more numerous than the pores of the dielectric layer 111 of the active portion, the dielectric composition of the margin portions 114 and 115 may be different in types and contents of an additive or a binder, with respect to the dielectric composition of the dielectric layer 111 of the active portion.

For example, there may be a method of adjusting an amount of magnesium (Mg), included in the margin parts 114 and 115 to be less than a content of magnesium (Mg) included in the dielectric layer 111 of the active portion.

Alternatively, there may be a problem in which the binder used to form the dielectric layer 111 of the active portion uses a polyvinyl butyral (PVB) based binder as in the prior art, and the binder used to form the margin parts 114 and 115 uses an acryl-based binder.

In the present embodiment, the dielectric composition of the margin portions 114 and 115 may be different from the dielectric composition of the dielectric layer 111 of the active portion, and at the same time, the dielectric composition of the margin portions 114 and 115 may be different from that the dielectric composition of the upper and lower cover portions 112 and 113, but is not necessarily limited thereto.

Referring to FIG. 6, in a multilayer ceramic capacitor according to another embodiment of the present disclosure, the margin portions 114 and 115 may have a larger number or density of pores P than the dielectric layer 111 of the active portion, and the margin portions 114 and 115 may include a ceramic-polymer composite in which the polymer 140 is filled in the pores P of the margin portions 114 and 115.

According to an embodiment of the present disclosure, margin portions 114 and 115 of a porous structure in which pores of the margin portions 114 and 115 after sintering are more numerous than pores of the dielectric layer 111 of the active portion may be formed, and the pores of the margin portions 114 and 115 may be filled with a polymer, and the margin portions 114 and 115 may be formed to have a ceramic-polymer composite structure, thereby improving bending strength and at the same time improving moisture resistance reliability.

Specifically, when the polymer is filled in the pores of the margin portions 114 and 115 and the margin portions 114 and 115 are formed to have a ceramic-polymer composite structure, since ductility of the margin portions 114 and 115 may be improved, the bending strength may be improved, and at the same time, the moisture resistance reliability may be improved.

In addition, by forming the margin portions 114 and 115 in a ceramic-polymer composite structure, it is possible to solve a problem of lowering the moisture resistance reliability due to a transfer of charges by reducing electrical conductivity.

Figure 7:
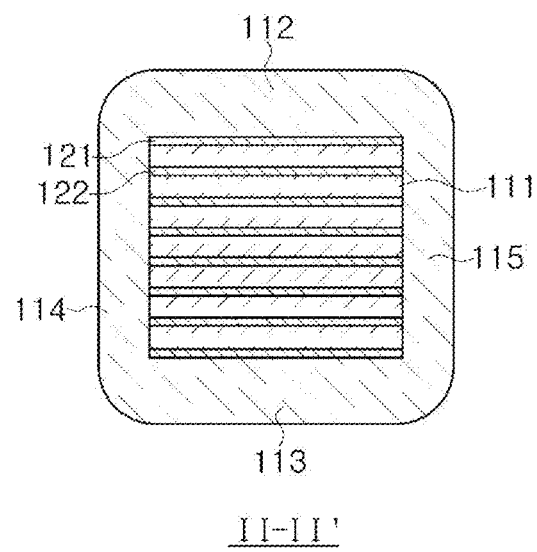
FIG. 7 is a cross-sectional view taken along the line II-II' of FIG. 1 according to another embodiment of the present disclosure.

FIG. 7 is a cross-sectional view taken along the line II-II' of FIG. 1 according to another embodiment of the present disclosure.

Referring to FIG. 7, in another embodiment of the present disclosure, the dielectric composition of the upper and lower cover portions 112 and 113 may be different from the dielectric composition of the dielectric layer 111 of the active portion, but may be the same as the dielectric composition of the margin portions 114 and 115.

Since other features are the same as in the above-described other embodiments of the present disclosure, a detailed description thereof will be omitted.

A method of manufacturing a multilayer ceramic capacitor according to another embodiment of the present disclosure includes operations of: preparing a plurality of first ceramic green sheets on which a plurality of first internal electrode patterns are formed and a plurality of first ceramic green sheets on which a plurality of second internal electrode patterns are formed; stacking the plurality of first ceramic green sheets so that the first internal electrode patterns and the second internal electrode patterns overlap with each other, and stacking a second ceramic green sheet having a composition different from the composition of the first ceramic green sheet on upper and lower portions thereof to form a laminated body, and preparing a ceramic body including a dielectric layer and first and second internal electrodes by sintering the laminated body. The ceramic body includes an active portion including first and second internal electrodes disposed to oppose each other with the dielectric layer interposed therebetween to form capacitance and a cover portion formed in upper and lower portions of the active portion, and the cover portion has a larger number or density of pores than that of the dielectric layer of the active portion. After the operation of preparing the ceramic body, an operation of applying a paste including a polymer to the cover portion to fill the pores of the cover portion with the polymer is included.

Hereinafter, a method of manufacturing a multilayer ceramic capacitor according to another embodiment of the present disclosure will be described.

According to another aspect of the present disclosure, there is provided a method of manufacturing a multilayer ceramic capacitor. First, a plurality of first ceramic green sheets on which a plurality of first internal electrode patterns are formed and a plurality of first ceramic green sheets on which a plurality of second internal electrode patterns are formed.

The plurality of first ceramic green sheets may be formed of a ceramic paste including ceramic powder, an organic solvent, and an organic binder.

The ceramic powder is a material having a high dielectric constant, but is not limited thereto, and may be a barium titanate ($BaTiO_3$) based material, a lead composite perovskite based material, or the like, and may be preferably barium titanate ($BaTiO_3$) powder. When the ceramic green sheet 211 is fired, the ceramic green sheet 211 becomes a dielectric layer 111 constituting the ceramic body 110.

The first internal electrode pattern and the second internal electrode pattern may be formed by an internal electrode paste including a conductive metal. The conductive metal is not limited thereto, but may be nickel (Ni), copper (Cu), palladium (Pd), or an alloy thereof.

A method of forming the first internal electrode pattern and the second internal electrode pattern on the first ceramic green sheet is not particularly limited, but may be formed by, for example, a printing method such as a screen-printing method or a gravure printing method.

Next, the plurality of first ceramic green sheets are stacked to overlap the first internal electrode pattern and the second internal electrode pattern, and second ceramic green sheets having a composition different from the composition of the first ceramic green sheet are disposed on upper and lower portions thereof to form a laminated body.

The second ceramic green sheets having a composition different from that of the first ceramic green sheet is used to form upper and lower cover layers by stacking the plurality of second ceramic green sheets on the upper and lower portions of the laminated body.

In an embodiment of the present disclosure, the second ceramic green sheets have a composition different from that of the first ceramic green sheet in order to have a porous structure in which the pores of the upper and lower cover layers after sintering are more numerous than (e.g., are disposed with higher density than) the pores of the dielectric layer of the active portion.

In addition, since the second ceramic green sheets are used to form upper and lower cover layers, internal electrode patterns are not formed thereon, unlike the first ceramic green sheet.

Next, a ceramic body including a dielectric layer and first and second internal electrodes is prepared by sintering the laminated body.

By sintering the laminated body, the ceramic body includes an active portion including first and second internal electrodes disposed to oppose each other with the dielectric layer interposed therebetween to form capacitance, and a cover portion formed in upper and lower portions of the active portion.

In an embodiment of the present disclosure, as described above, since the second ceramic green sheet for forming the upper and lower cover layers has a composition different form the composition of the first ceramic green sheet for forming the dielectric layer, the cover portion after sintering has a porous structure having a larger number of pores than the dielectric layer of the active portion.

Figure 8:
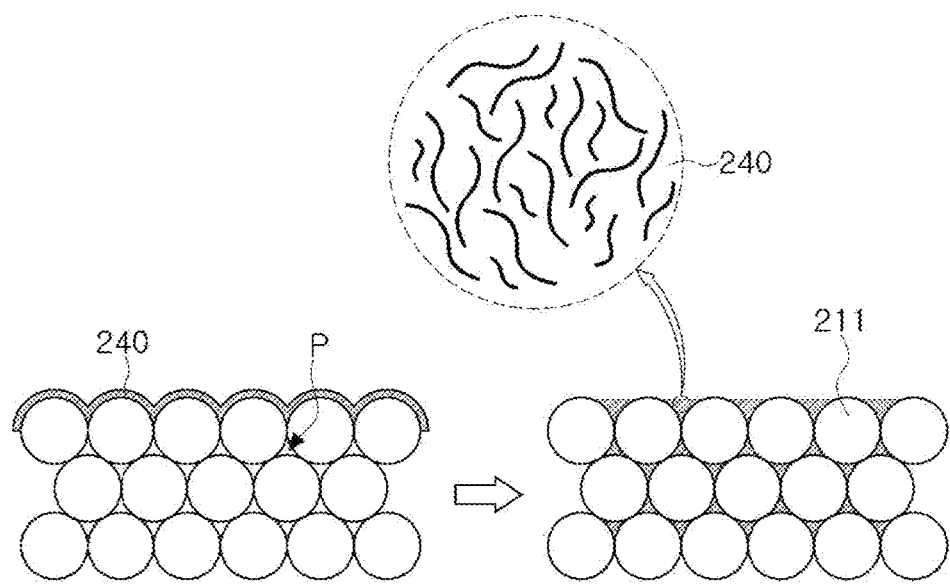
FIG. 8 is a schematic diagram illustrating an operation of filling a polymer in pores of a cover portion in a method of manufacturing a multilayer ceramic capacitor according to an embodiment of the present disclosure.

FIG. 8 is a schematic diagram illustrating an operation of filling a polymer in pores of a cover portion in a method of manufacturing a multilayer ceramic capacitor according to an embodiment of the present disclosure.

Referring to FIG. 8, in the method of manufacturing the multilayer ceramic capacitor according to an embodiment of the present disclosure, a paste including a polymer is applied to the cover portion after an operation of preparing the ceramic body, after sintering is completed, to fill pores of the cover portion with the polymer.

A method of applying the paste including the polymer to the cover portion is not particularly limited, and may be performed by, for example, a dipping, a spin coating, a spraying method, and the like.

It is preferable to use a liquid crystal polymer (LCP), which is a high heat-resistance thermoplastic resin, as the polymer. Such a liquid crystal polymer may be an aromatic liquid crystal polyester.

When performed by the method, the polymer 240 is applied above a dielectric grain 211 of the cover portion, and then the polymer 240 will be filled in pores formed between the dielectric grains 211 of the cover portion by a post-treatment process.

The post-treatment process may be performed after the operation of filling the polymer in the pores of the cover portion, and may be performed using any one or more of heat, UV, IR, and laser.

Subsequently, external electrodes may be formed on a third side surface of the ceramic body to which the first internal electrode is exposed and a fourth side surface of the ceramic body to which the second internal electrode is exposed.

Description of the same parts as the features of the embodiment of the present disclosure described above will be omitted here in order to avoid duplication.

As set forth above, according to an embodiment of the present disclosure, a cover portion may be formed to have a porous structure in which pores of the cover portion after sintering are more numerous than pores of the dielectric layer of the active portion, and the pores of the cover portion may be filled with a polymer and the cover portion may be formed of a ceramic-polymer composite structure, such that it is possible to improve bending strength and improve the moisture resistance reliability.

In addition, by forming the cover portion in a ceramic-polymer composite structure, it is possible to reduce electrical conductivity and solve a problem of lowering moisture resistance reliability due to a transfer of charges.

In addition, after sintering, a margin part may be formed to have a porous structure in which pores of the margin part after sintering are more numerous than pores of the dielectric layer of the active portion, and the margin part may be formed of a ceramic-polymer composite structure by filling the pores of the margin part with a polymer, such that bending strength may be improved and moisture resistance reliability may be improved.

What is claimed is:
1. A multilayer ceramic capacitor, comprising:
a ceramic body including a dielectric layer and first and second internal electrodes disposed to oppose each other with the dielectric layer interposed therebetween, and having a first surface and a second surface opposing each other, a third surface and a fourth surface opposing each other and connecting the first and second surfaces, and a fifth surface and a sixth surface connected to the first to fourth surfaces and opposing each other; and
first and second external electrodes disposed outside of the ceramic body, and connected to the first and second internal electrodes, respectively,
wherein the ceramic body comprises an active portion including the first and second internal electrodes disposed to oppose each other with the dielectric layer interposed therebetween to form capacitance, and a cover portion disposed in upper and lower portions of the active portion, the cover portion comprises a ceramic-polymer composite filled with a polymer in the pores of the cover portion, and at least a portion of the polymer filled in the pores of the cover portion is physically isolated from the first and second internal electrodes.

2. The multilayer ceramic capacitor of claim 1, wherein the dielectric layer of the active portion is free of the polymer.

3. The multilayer ceramic capacitor of claim 1, wherein a dielectric composition of the cover portion and a dielectric composition of the dielectric layer of the active portion are different from each other.

4. The multilayer ceramic capacitor of claim 1, wherein a margin portion is disposed on both sides of the active portion, the margin portion having a larger number of pores than the dielectric layer of the active portion, and the margin portion comprises a ceramic-polymer composite filled with a polymer in the pores of the margin portion.

5. The multilayer ceramic capacitor of claim 4, wherein a dielectric composition of the margin portion and a dielectric composition of the dielectric layer of the active portion are different from each other.

6. The multilayer ceramic capacitor of claim 4, wherein a dielectric composition of the margin portion and a dielectric composition of the dielectric layer of the active portion are the same as each other.

7. The multilayer ceramic capacitor of claim 1, wherein the cover portion has a larger number of pores than the dielectric layer of the active portion.

8. The multilayer ceramic capacitor of claim 1, wherein the dielectric layer is interposed between the first and second internal electrodes in a stacking direction, and the polymer is filled in the pores of the cover portion between dielectric grains in the stacking direction.

* * * * *